United States Patent [19]

Horner et al.

[11] Patent Number: 4,529,009
[45] Date of Patent: Jul. 16, 1985

[54] MULTIPLE CORE HOSE

[75] Inventors: David J. Horner, Tadcaster; Robert B. Robertson, Pennyffordd; Kenneth G. Searle, Grinshill, Near Shrewsbury, all of England

[73] Assignee: Plascoat U.K. Limited, Surrey, England

[21] Appl. No.: 520,040

[22] Filed: Aug. 3, 1983

[51] Int. Cl.³ .............................................. F16L 09/18
[52] U.S. Cl. ..................................... 138/111; 138/114; 138/113
[58] Field of Search ............... 138/111, 112, 113, 114, 138/115, 148, 118, 157; 165/154, 157, 162

[56] References Cited

U.S. PATENT DOCUMENTS

| | | | |
|---|---|---|---|
| 437,445 | 9/1890 | Morton | 138/115 X |
| 2,000,906 | 5/1935 | Turner | 138/111 X |
| 3,233,567 | 2/1966 | Goldfield | 138/111 X |
| 3,590,855 | 7/1971 | Wollen et al. | 138/111 X |
| 3,699,692 | 10/1972 | Smith | 138/111 X |
| 3,797,529 | 3/1974 | Gebelius | 138/111 |
| 4,456,058 | 6/1984 | Powell | 138/112 X |

FOREIGN PATENT DOCUMENTS

| | | | |
|---|---|---|---|
| 2035995 | 12/1970 | France | 138/111 |
| 30708 | of 1898 | United Kingdom | 138/111 |
| 522305 | 9/1939 | United Kingdom . | |
| 914810 | 4/1959 | United Kingdom . | |
| 1211169 | 11/1968 | United Kingdom . | |
| 1239194 | 4/1969 | United Kingdom . | |
| 2083603 | 2/1981 | United Kingdom . | |
| 1005225 | 2/1982 | United Kingdom . | |
| 1005226 | 2/1982 | United Kingdom . | |
| 286881 | 2/1971 | U.S.S.R. | 138/111 |

Primary Examiner—James E. Bryant, III
Attorney, Agent, or Firm—Biebel, French & Nauman

[57] ABSTRACT

A multiple core hose comprises a plurality of discrete hose assemblies, each including a primary hose formed from a flexible synthetic plastics material, having a fluid passage extending generally longitudinally therethrough, and a plurality of generally longitudinally extending recesses adapted to seat secondary hoses; a plurality of secondary hoses formed from a flexible synthetic plastics material, seated in the primary hose recesses, the secondary hoses having fluid passages extending generally longitudinally therethrough in heat transfer relation with the primary hose passage; and a flexible tubular sheath of a thermally insulating material, the primary/secondary hose assemblies being assembled together, side-by-side, with the seated secondary hoses disposed around the primary hose passages, within the sheath.

17 Claims, 7 Drawing Figures

MULTIPLE CORE HOSE

In public houses and such establishments beer is stored in barrels remote from the bar at which the beer is dispensed. The beer, for example lager, is conveyed to the beer dispenser along lengths of hose which lead from the barrels through a cooling device. However, in order to prevent the beer warming up as it passes along the hose from the cooling device to the dispenser it is necessary to keep the hose cool.

A previously proposed technique of keeping the beer cool as it passes from the cooling device to the dispenser involved running the beer-conveying hose adjacent a hose containing cooled water. Typically, a bundle of hoses was formed containing a pair of cooled water hoses to convey the water to and from the cooler, around which hoses were taped further hoses leading from the various barrels to their respective dispensers. The resultant bundle of hoses was then enclosed in a sheath of insulating material. This form of multiple core hose was unsatisfactory as it had to be formed by taping the hoses together manually which was time consuming and expensive. In addition as the hoses were merely taped together and then loosely inserted in the insulating sheath, considerable air gaps were formed both amongst the hoses and between the bundle of hoses and the insulating sheath. These air gaps led to poor heat transfer between the cooled hoses and the beer containing hoses and to the condensation of water vapour in the air in the air gaps. The resulting condensed water would then leak out at any break or join in the insulating sheath.

It is an object of the invention to provide a mutliple core hose which is capable of being constructed in a relatively simple manner, and in which the problems of poor heat transfer and condensation are substantially reduced.

From one aspect, the present invention provides, for a multiple core hose, a primary hose having at least one recess extending along the length of the outer surface of said primary hose adapted to seat at least one respective secondary hose.

From another aspect, the invention provides a primary hose as just defined in combination with a secondary hose seated in the or each recess.

From another aspect, the invention provides a multiple core hose formed of a plurality of primary/secondary hose assemblies as just defined.

Preferably each primary hose has a plurality of recesses each adapted to seat a respective secondary hose.

Each primary hose may be generally sector shaped in section, for example generally quadrant shaped, with each recess having a generally semi-circular section adapted to seat a secondary hose of circular section.

The section of the recess may extend beyond the semi-circular and thus be adapted to seat and retain the respective secondary hose.

The invention also consists in a method of forming a primary/secondary hose assembly as just defined, comprising extruding a primary hose, seating the secondary hoses in respective recesses in the primary hose, passing the primary hose and seated secondary hoses longitudinally through an extruder, and extruding synthetic plastics material against the primary hose, between and around the second hoses, to embed the secondary hoses.

The invention further consists in a hose assembly comprising a primary hose formed from a first flexible synthetic plastics material and defining a fluid passage extending generally longitudinally therethrough, and a plurality of generally longitudinally extending secondary hoses, preformed from a second flexible synthetic plastics material, embedded in the primary hose in heat transfer relation with the primary hose passage.

The invention will now be described by way of example with reference to the accompanying diagrammatic drawings, in which.

Figure 1:
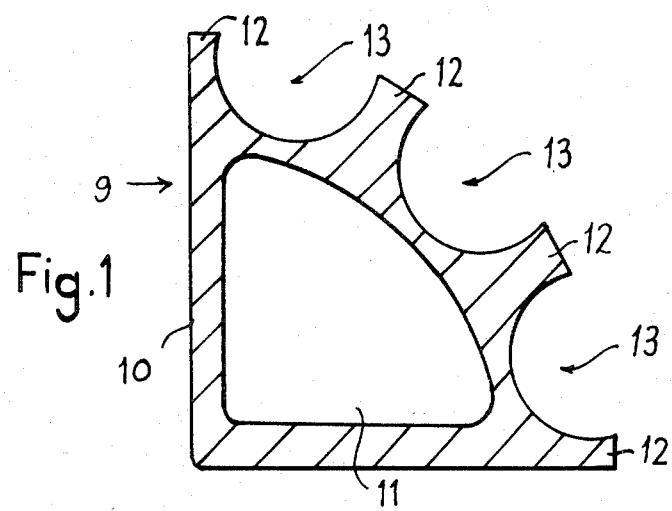
FIG. 1 is a section through a first embodiment of primary or supporting hose.
Figure 2:
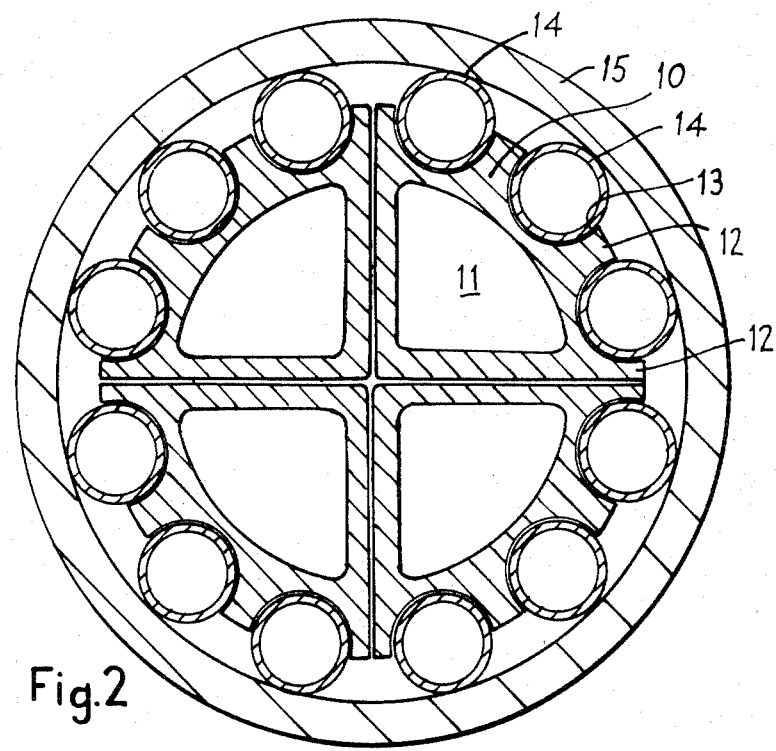
FIG. 2 is a section through a multiple core hose which uses the primary or supporting hose of FIG. 1.

The primary or supporting hose section 9 shown in FIG. 1 comprises an elongate, generally quadrant shaped portion 10 having a hollow interior region or passage 11 therein. On one face of the section there are four protrusions 12 which together define three generally semi-circular recesses 13. These recesses 13 in the section result in three longitudinally extending grooves down the one face of the hose. As shown in FIG. 2 each of the three grooves 13 in each primary hose is adapted to receive a standard circular section secondary hose 14. The primary hose is formed, for example extruded, from a flexible plastics material such as polyvinyl chloride (PVC) or a polyethylene. The secondary hoses are formed from a food- or brewery-approved flexible plastics material such as nylon or a polyethylene. As the section of each groove 13 is slightly greater than semi-circular, each secondary hose 14 may be located in its respective groove by a push fit, the flexible material of the hose 9 allowing the protrusions 12 to close around and thereby retain each secondary hose 14.

FIG. 2 shows a section through a composite or multiple core hose or loom made up of four similar primary hoses 9 each of which has three circular section secondary hoses 14 located in respective recesses 13. The composite hose includes a cylindrical sheath 15 of thermally insulating material, such as a foamed natural or synthetic rubber, located around the outside of the four primary/secondary hose assemblies, which also serves to hold the four hose assemblies together. The sheath 15 may be slid over the hose assemblies in appropriate lengths, with the ends of adjacent lengths overlapping each other. To increase the length of the sheath which may be applied in a single operation, the sheath may be expanded during insertion of the hose assemblies, for example by applying a partial vacuum to the exterior of the sheath.

Figure 2A:
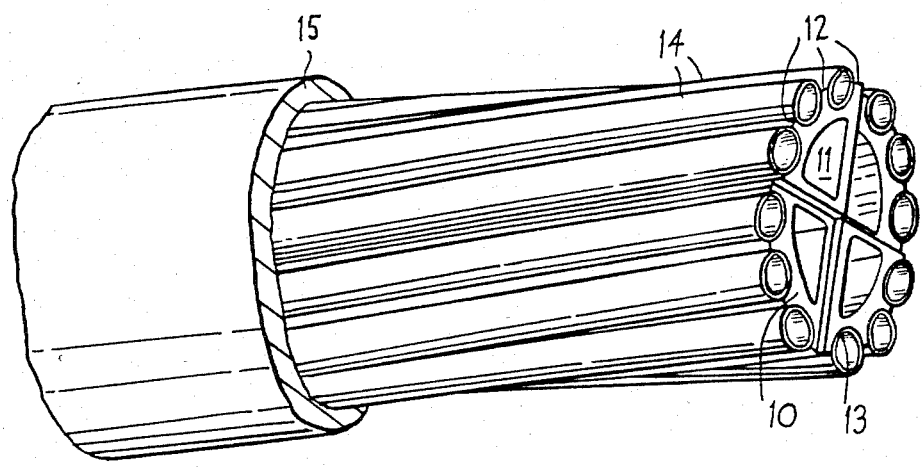
FIG. 2A is a side view, on a reduced scale, of the multiple core hose of FIG. 2, with the outer sheath partly broken away.

In use, cooled water is passed along the interiors 11 of two of the primary hoses 9 and returns along the remaining two interiors 11. Beer, such as a lager, from a barrel is conveyed to its respective dispenser down a respective secondary hose 14. During its travel along the hose 14 the beer is cooled by heat transer through hoses 14 and 9 to the cooling water. Heat transfer to the beer from the ambient air in minimised by the insulating sheath 15. Since the secondary hoses are slidable relative to the primary hoses, the primary hoses are slidable relative to each other, and the primary/secondary hose assemblies are slidable within the outer sheath, the composite hose is relatively flexible. Flexibility may be enhanced by twisting the hose assemblies in the manner of a stranded cable so that they follow a helical path within the outer sheath as shown in FIG. 2A. In addition, a lubricant, such as talc, may be applied between some or all of the various components.

Figure 3:
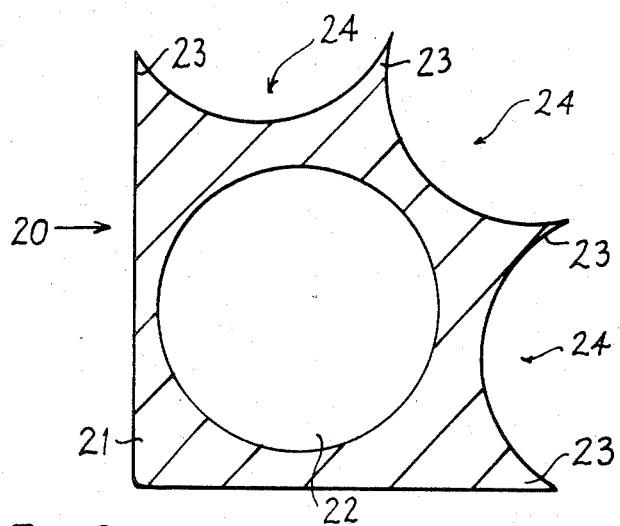
FIG. 3 is a section through a second embodiment of primary or supporting hose.
Figure 4:
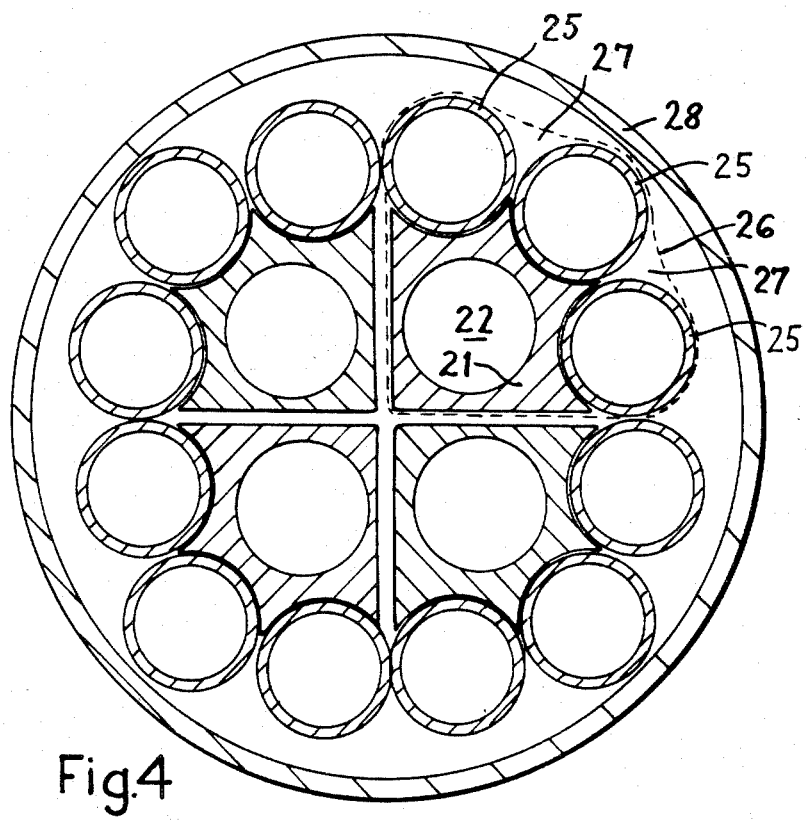
FIG. 4 is a section through a multiple core hose which uses the primary or supporting hose of FIG. 3.

FIG. 3 shows a section through a second embodiment of primary hose. As in the embodiment shown in FIGS. 1 and 2, the hose 20 comprises a generally quadrant shaped portion 21 having a hollow interior region or passage 22. On one face of the section there are four generally triangular shaped protrusions 23 which together define three generally semi-circular recesses 24. The recesses 24 in the section result in three longitudinally extending grooves down the one face of the hose. As shown in FIG. 4 each of the three grooves 24 in each hose 20 is adapted to seat a standard circular section secondary hose 25. As in the previous embodiment the hose 20 is formed in a flexible plastics material such as PVC. As the area of each of the protrusions 23 is less than that of the protrusions 12 the hose 20 is more flexible than hose 9. However, as the grooves 24 are simply adapted to seat each circular section secondary hose 25, each set of three secondary hoses 25 is secured to its respective primary hose 20 by a plastics envelope or sheath 26. The plastics sheath 26 is extruded around the set of four hoses and tends to cling closely to the hoses thus acting as a filler and minimising the air gaps 27. Four such primary/secondary hose assemblies are then enclosed and retained assembled together in a cylindrical sheath 28 of thermally insulating material to complete the multiple core hose or loom.

Figure 5:
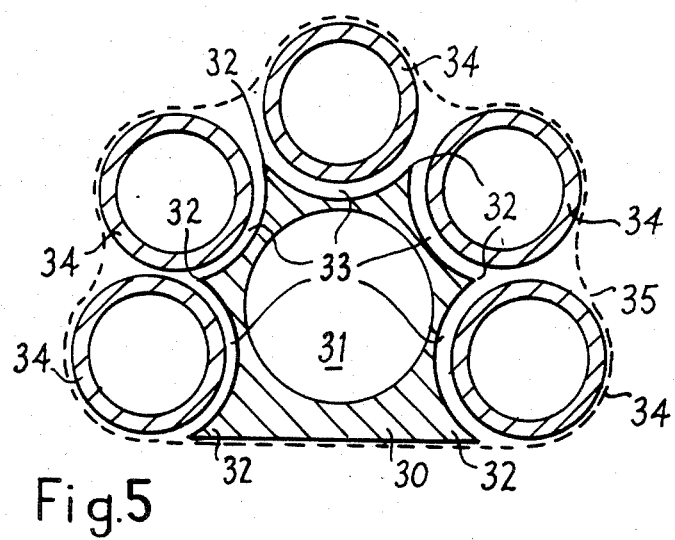
FIG. 5 is a section through a further embodiment of primary/secondary hose assembly.

FIG. 5 shows a section through a further embodiment of primary/secondary hose assembly. The primary hose 20 has a hollow interior region or passage 31 and six generally triangular protrusions 32. The protrusions 32 together define five generally semi-circular recesses 33 which result in five grooves extending down the outer face of the hose 30. Each of the five grooves is adapted to seat a respective circular section secondary hose 34. As in the embodiment shown in FIG. 4 the secondary hoses 34 are secured to the primary hose 30 by a plastics envelope or sheath 35 which is extruded around the set of six hoses. Two such primary/secondary hose assemblies may then be combined and enclosed in a cylindrical sheath (not shown) of thermally insulating material to complete a multiple core hose or loom.

Figure 6:
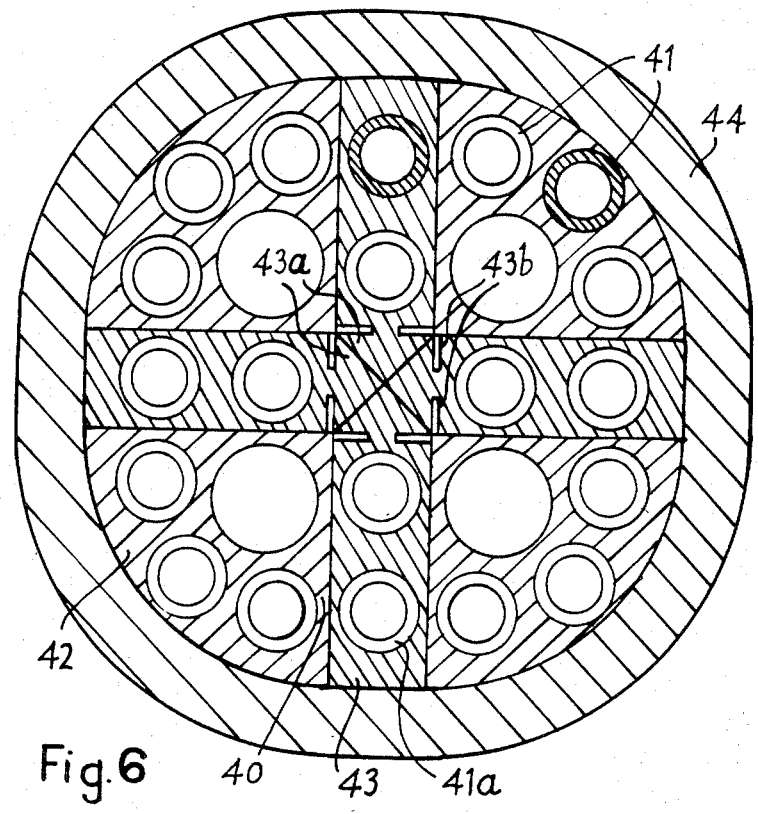
FIG. 6 is a section through another embodiment of multiple core hose.

In the embodiment shown in FIG. 6, each primary/secondary hose assembly basically comprises a primary hose 40, for example similar to that shown in FIG. 1 or 3, and associated secondary hoses 41 seated on the primary hose. A filler 42 is applied to the seated secondary hoses to embed the latter and provide the primary/secondary hose assembly with a part circular profile. This may be achieved by passing the primary hose and seated secondary hoses through an extruder where a plastics material comprising the filler 42 is cast against the primary hose around the secondary hose. The cast plastics material, which may be the same as that of the primary hose, is arranged to bond to the primary hose 40, but not to the secondary hoses 41, so that the secondary hoses are capable of sliding within the primary hose, thus enhancing the flexibility of the primary/secondary hose assembly.

In order to increase the total number of available secondary hoses 41, and to enable the number of secondary hoses to be varied, a cruciform core, formed from four discrete longitudinally extending strips 43, is employed. The strips are moulded from a flexible plastics material, and each has a number of additional secondary hoses 41a, for example two secondary hoses 41a, embedded therein. The radially inner end 43a of each strip is triangular in section, so that the inner ends of the four strips will interfit as shown. The inner end 43a of each strip is connected by a necked or weakened zone defined by a pair of longitudinally extending slots 43b to the main body of the strip. The slots 43b increase the flexibility of the core, and therefore of the multiple core hose as a whole, and also enable the inner ends 43a to be detached from the main bodies of the strips 43 if required. The cruciform core, with the four primary/secondary hose assemblies located thereon, is inserted into an outer thermally insulating sleeve 44 as in the previous embodiments.

It will be apparent from FIG. 6 that the provision of the core and associated additional secondary hoses 41a increases the maximum number of secondary hoses from 12 to 20. If fewer secondary hoses are required, two diametrically opposed strips 43 are omitted, and the inner ends 43a of the two remaining diametrically opposed strips are detached, so that the latter strips will not project radially beyond the peripheries of the hose assemblies. Thus, the number of secondary hoses is reduced by four, to sixteen. To reduce the number of secondary hoses till further, to twelve, all four strips 43 are omitted, i.e. the core is omitted in its entirety.

The changes in overall circumferential dimensions of the hose/core assembly due to the incorporation or omission of the core, or omission of two of the strips 43, are such that a range of different diameter outer sheaths 44 is not required, since the elasticity of a single sheath is, in practice, capable of accommodating these changes. This possesses the advantage that a multiple core hose may be assembled on sight, with a choice of the number of secondary hoses, without the necessity of providing alternative outer sheaths.

As in the previous embodiments, the flexibility of the multiple core hose or loom is enhanced by virtue of the fact that the various components are not positively anchored, but are slidable relative to each other within the outer sheath. In addition, flexibility may be enhanced by twisting the assembled primary/secondary hose assemblies, and strips 43 if provided, about their longitudinal axis before insertion into the sleeve. For example, in one specific numerical embodiment, the assemblies may be twisted through 360° over a length of 2 meters in a multiple core hose having an overall diameter of 2 inches.

The embodiment shown in FIG. 6 not only possesses the advantage of versatility, but the existence of voids or air gaps is effectively eliminated.

Since, in all of the previously described multiple core hoses or looms, the secondary hoses are not bonded to their associated primary hoses, the ends of the secondary hoses may be simply exposed by pairing back the primary hose and outer sleeve, by amounts sufficient to enable the various individual secondary hoses to be attached directly to their associated dispensing units. Likewise, each pair of supply and return passages in the primary hoses may be readily interconnected by stainless steel U tubes or equivalent inserted into the ends of the passages at the dispensing or outlet end of the loom.

In order to reduce the possibility of leakage between the primary hoses and U tubes, the end portions of the primary hoses from which the secondary hoses have been separated, are paired or trimmed, and clamped by a common annular hose clip or equivalent.

At the inlet end of the loom, the secondary hoses are similarly exposed and connected directly to the source of beer or other beverage to be dispensed. The passages in the primary hoses are simply coupled to the supply and return connections of a water cooler.

It will be understood that various modifications may be made without departing from the scope of the present invention as defined in the appended claims.

For example, the plastics material of the primary hoses, and in particular of the filler 42 in the embodiment of FIG. 6, may be foamed to enhance its thermally insulated properties relative to the ambient atmosphere. In this event, however, to ensure efficient heat transfer between the liquids in the secondary and primary hoses, the secondary hoses should be disposed as close to the primary hose passages as possible.

Additionally or alternatively, in order to enhance heat transfer between the liquids in the primary and secondary hoses, the plastics material of the primary hoses (the hose 40 in the case of the embodiment of FIG. 6) may be filled or loaded with a metallic filler or fillers.

Additionally or alternatively, the primary/secondary hose assemblies may, individually or in groups, be provided with an external reflective layer. For example the individual or groups of hose assemblies may be enveloped in a plastic sheath or film, corresponding to the sheath 26 in FIG. 4, having a metalised layer thereon. The purpose of this reflective or metalised layer is to reflect heat back from the ambient air, and thus insulate the hose assemblies The outer insulating sheath, i.e. the sheath 15, 28 or 44 in the illustrated embodiments, may be extruded around the assembled primary/secondary hose assemblies instead of being preformed and fitted thereto. This possesses the advantage that, particularly in the embodiments of FIGS. 2 and 4, the sheath would more closely fit the hose assemblies and further reduce the voids or air gaps.

Instead of assembling each primary/secondary hose assembly shown in FIG. 6 from a preformed inner primary hose 40, the primary hose and filler may be formed simultaneously as a single extrusion, in which the secondary hoses are embedded.

Although the individual primary/secondary hose assemblies specifically described incorporate a single primary hose passage and three secondary hoses, the numbers of such passages and/or hoses may be varied, and in particular, more than three secondary hoses may be provided. Likewise, in the embodiment of FIG. 6, the strips 43 may incorporate more or less than three additional secondary hoses 41a.

The multiple core hose may be used with beverages other than beer, or with any other liquid or liquids where cooling or heating is required.

We claim:
1. A multiple core hose comprising:
(1) a plurality of discrete hose assemblies, each including
  (a) a primary hose formed from a flexible synthetic plastics material, having
    (i) a fluid passage extending generally longitudinally therethrough, and
    (ii) a plurality of generally longitudinally extending recesses adapted to seat secondary hoses;
  (b) a plurality of secondary hoses formed from a flexible synthetic plastics material, seated in the primary hose recesses, the secondary hoses having fluid passages extending generally longitudinally therethrough in heat transfer relation with the primary hose passage; and
(2) a flexible tubular sheath of a thermally insulating material,
the hose assemblies being assembled together, side-by-side, with the seated secondary hoses disposed around the primary hose passages, within the sheath.

2. A hose as claimed in claim 1, wherein each primary hose is formed from a first flexible synthetic plastics material, and is generally quadrant-shaped in cross-section, and wherein each secondary hose is formed from a second flexible synthetic plastics material different from that of the primary hoses, and is generally circular in cross-section, the recesses being configured to conform to their respective secondary hoses whereby the primary and secondary hoses are in intimate heat-transfer contact, the hose assemblies being generally longitudinally slidable relative to each other upon flexure of the multiple core hose.

3. A hose as claimed in claim 2, wherein the secondary hoses are slidable relative to their associated primary hoses upon flexure of the multiple core hose.

4. A hose as claimed in claim 2, wherein the cross-section of each recess is more than semi-circular in circumferential extent, thereby to seat and retain its associated secondary hose.

5. A hose as claimed in claim 2, wherein the primary hose of each hose assembly has, in cross-section, a generally arcuately shaped portion defined, at least in part, by filler means comprising a flexible synthetic plastics material cast between and around the secondary hoses, the filler means filling spaces which would otherwise exist between the hose assembly and the sheath.

6. A hose as claimed in claim 5, wherein the hose assemblies mutually cooperate to define a generally circular shape in section, the flexible sheath being generally cylindrical and retaining said mutual cooperation of the assemblies.

7. A hose as claimed in claim 6, including flexible longitudinally extending spacer means interposed between at least some of the primary hoses, the spacer means incorporating additional secondary hoses.

8. A hose as claimed in claim 7, wherein the spacer means comprise an assembly of discrete strips forming the arms of a generally cruciform core, with the hose assemblies located between adjacent pairs of arms of the cruciform core, each strip having plural additional secondary hoses embedded therein, and being formed from a flexible synthetic plastics material different from that of the additional secondary hoses.

9. A hose as claimed in claim 8, wherein the arms are selectively removable to vary the number of additional secondary hose.

10. A hose as claimed in claim 9, wherein the strips are slotted longitudinally adjacent their radially inner ends to increase their flexibility.

11. A hose as claimed in claim 10, wherein the radially inner ends of the strips are generally triangular in section so as to mutually interfit, each triangular inner end having a radial height approximating one half of the circumferential thickness of each strip, and being partially separated from the remainder of its strip by a pair of longitudinally extending slots to define a weakened region to enable the triangular end to be detached from the remainder of its strip.

12. A hose as claimed in claim 2, wherein the hose assemblies are disposed generally helically about the longitudinal axis of the multiple core hose.

13. A hose as claimed in claim 1, including reflective means disposed outwardly of the secondary hoses to reflect heat from the ambient air away from the secondary hoses.

14. A hose assembly for a flexible multiple core hose, comprising:
 (a) a primary hose formed from a first flexible synthetic plastics material, and defining a fluid passage extending generally longitudinally therethrough, and
 (b) a plurality of generally longitudinally extending secondary hoses, preformed from a second flexible synthetic plastics material, embedded in the primary hose in heat transfer relation with the primary hose passage;
the primary hose being generally sector shaped in section whereby a plurality of hose assemblies are capable of being assembled together in side-by-side relation to form a composite assembly of generally circular section, with the individual hose assemblies being slidable relative to each other upon flexure of the composite assembly.

15. An assembly as claimed in claim 14, wherein the secondary hoses are slidable within and relative to the primary hose upon flexure of the hose assembly.

16. An assembly as claimed in claim 14, wherein the primary hose is bounded by generally planar side faces which mutually intersect at an included angle of approximately 90 degrees, and an arcuate outer face spanning the side faces, thereby to define a quadrant section, the primary hose passage being located adjacent the intersection of the side faces, and the secondary hoses being located adjacent the arcuate outer face.

17. A flexible hose assembly for a multiple core hose comprising:
 (a) a primary hose formed from a first flexible synthetic plastics material, and defining a fluid passage extending generally longitudinally therethrough, the primary hose being bounded by generally planar side faces which intersect at an included angle of approximately 90 degrees and a generally arcuate outer face spanning the side faces, whereby the primary hose is generally quadrant shaped in section, and
 (b) a plurality of generally longitudinally extending secondary hoses, preformed from a second flexible synthetic plastics material, embedded in the primary hose in heat transfer relation with the primary hose passage, and disposed between the primary hose passage and the generally arcuate outer face of the primary hose, the secondary hoses being slidable within and relative to the primary hose upon flexure of the hose assembly.

* * * * *